US012555964B1

(12) United States Patent
Liang

(10) Patent No.: US 12,555,964 B1
(45) Date of Patent: Feb. 17, 2026

(54) MULTIFUNCTIONAL TRAVEL PLUG

(71) Applicant: Shenzhen Hongxi Technology Co., Ltd., Guangdong (CN)

(72) Inventor: Zhong Liang, Guangdong (CN)

(73) Assignee: Shenzhen Hongxi Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/276,034

(22) Filed: Jul. 22, 2025

(30) Foreign Application Priority Data

Jul. 1, 2025 (CN) ......................... 202510902874.4

(51) Int. Cl.
*H01R 31/00* (2006.01)
*H01R 31/06* (2006.01)

(52) U.S. Cl.
CPC .................................... *H01R 31/06* (2013.01)

(58) Field of Classification Search
CPC ...................................................... H01R 31/06
See application file for complete search history.

(56) References Cited

U.S. PATENT DOCUMENTS 6,556,002 B1 * 4/2003 Greenbaum ........... H01Q 21/24 324/76.52
6,641,441 B2 * 11/2003 Liu ...................... G06K 7/0013 439/630
7,537,486 B2 * 5/2009 Hong ................... G06K 7/0021 439/153
7,568,928 B2 * 8/2009 Hou ................... H01R 13/2442 439/188
8,740,635 B2 * 6/2014 Lim ....................... G06K 13/08 439/159
9,444,181 B2 * 9/2016 Ishihara ................. H01R 13/60
2015/0180184 A1 * 6/2015 Ishihara ................. H01R 13/60 439/676

* cited by examiner

*Primary Examiner* — Phuong Chi Thi Nguyen

(57) ABSTRACT

A multifunctional travel plug includes a housing, a first plug, and a second plug. The first plug and the second plug are disposed on a same side of the housing, and the housing is provided with a first accommodating slot configured to foldably accommodate the first plug and a second accommodating slot configured to foldably accommodate the second plug. When the first plug is opened, the second plug is restricted from opening, and when the second plug is opened, the first plug is restricted from opening. The foldable first plug and the second plug are disposed on the same side of the housing, and the two plugs are prevented from being opened simultaneously through an interlocking mechanism. There is no need to open holes or arrange a push-button structure on another side thereof, such that the plug has a smaller overall thickness and a larger internal space.

9 Claims, 6 Drawing Sheets

MULTIFUNCTIONAL TRAVEL PLUG

CROSS REFERENCE TO RELATED APPLICATIONS

The present application claims the benefit of Chinese Patent Application No. 202510902874.4 filed on Jul. 1, 2025, the contents of which are incorporated herein by reference in their entirety.

TECHNICAL FIELD

The present disclosure relates to the technical field of plugs, and in particular to a multifunctional travel plug.

BACKGROUND

With the increasing frequency of global travel, users' demand for portable power conversion devices (such as travel plugs) compatible with multiple socket standards of different countries and regions is continuously growing. Therefore, multifunctional travel plugs compatible with multiple plug standards have appeared on the market. Such products are usually provided with rotatable or retractable pin assemblies, which allows users to switch different shapes of plugs to adapt to target sockets.

However, currently, a conventional plug is provided with two types of pins disposed on a same plane, at least one type of pins are designed to have a push-button structure, and a track hole is formed on another side for pushing by the push-button structure. However, as a result, the plug has a larger overall thickness, a small internal space, a larger overall volume, and a higher center of gravity, thereby causing instability of plug-in connection with the socket.

Additionally, such multifunctional travel plugs have a key technical defect in practical use: when two different types of plugs are integrated in the same housing, it is challenging to effectively and reliably prevent the user from mistakenly switching the two types of plugs to an operating state (i.e., simultaneously coming into contact with conductive sheets of an internal power supply). Such misoperation may cause conductive parts (pin shafts/contacts) of the two plugs to be simultaneously connected to positive and negative poles of the internal power supply, which easily causes an internal short-circuit fault, electrical arcing, even device burnout or safety accidents, thereby posing severe threats to users and devices.

SUMMARY

An objective of the present disclosure is to provide a multifunctional travel plug, with an aim to develop a thinner travel plug with a large internal space, an interlocking function, a simple structure, and lower manufacturing costs.

To achieve the above objective, the present disclosure provides a multifunctional travel plug, and the multifunctional travel plug includes a housing, a first plug, and a second plug;

the first plug and the second plug are disposed on a same side of the housing, and the housing is provided with a first accommodating slot configured to foldably accommodate the first plug and a second accommodating slot configured to foldably accommodate the second plug; and when the first plug is opened, the second plug is restricted from opening from the second accommodating slot;

and when the second plug is opened, the first plug is restricted from opening from the first accommodating slot.

In a preferred embodiment, the multifunctional travel plug further includes two conductive sheets and a movable limiting block;

the housing is internally provided with a fixed bracket and a main board; the movable limiting block is disposed in the housing;

the two conductive sheets are respectively fixed to both sides of the fixed bracket and configured to respectively connect positive and negative input interfaces of the main board;

the first plug includes a first rotating block, two first rotating shafts respectively disposed on both sides of the first rotating block, and two first pin shafts penetrating the first rotating block, a first contact electrically connected to the corresponding first pin shaft is disposed at a predetermined position of either of the first rotating shafts, and when the first rotating block rotates to an operating state, the first contacts on both sides are respectively electrically connected to the two conductive sheets; and the second plug includes two second rotating blocks, two second rotating shafts respectively disposed on a side on which the two second rotating blocks are mutually away from each other, and two second pin shafts respectively penetrating the two second rotating blocks, where a second contact electrically connected to the corresponding second pin shaft is disposed at a predetermined position of either of the second rotating shafts, and when the two second rotating blocks rotate to the operating state, the two second contacts are respectively electrically connected to the two conductive sheets; and the first plug and the second plug are disposed on a same side of the housing, and the housing is provided with a first accommodating slot configured to accommodate the first plug and a second accommodating slot configured to accommodate the second plug; and the first rotating shaft is further provided with a first actuating block, and the second rotating shaft is further provided with a second actuating block; when the first plug rotates to the operating state, the first actuating block pushes the movable limiting block to a first position, such that the movable limiting block restricts the rotation of the second actuating block; and when the second plug rotates to the operating state, the second actuating block pushes the movable limiting block to a second position, such that the movable limiting block restricts the rotation of the first actuating block.

In a preferred embodiment, either of the conductive sheets includes: a metal sheet body, one or two first conductive elastic pieces spaced apart, and one or two second conductive elastic pieces spaced apart; the first conductive elastic piece and the second conductive elastic piece are both disposed on the metal sheet body; the first rotating shaft is configured to drive the first contact to rotate to abut against or be away from the first conductive elastic piece; and the second rotating shaft is configured to drive the second contact to rotate to abut against or be away from the second conductive elastic piece.

In a preferred embodiment, a first mounting block is coaxially disposed at an end of the first rotating shaft away from the first rotating block, the first mounting block includes four first abutment surfaces enclosing a rectangle, and the first contacts are mounted on one of the first abutment surfaces or mounted on two opposite first abutment surfaces to be electrically connected to the first conductive elastic piece; and the second mounting block is coaxially disposed at an end of the second rotating shaft away from the second rotating block, the second mounting block includes four second abutment surfaces enclosing a rectangle, and the second contacts are mounted on one of the second abutment surfaces or mounted on two opposite second abutment surfaces to be electrically connected to the second conductive elastic piece.

In a preferred embodiment, a free end of the first conductive elastic piece is inclined in a direction away from the first mounting block, and a free end of the second conductive elastic piece is inclined in a direction away from the second mounting block.

In a preferred embodiment, a first limiting slot and a second limiting slot spaced apart from each other are disposed at the movable limiting block, and sides of the first limiting slot and the second limiting slot that are away from each other are perpendicular to a moving direction of the movable limiting block; when the movable limiting block moves to the first position, the first actuating block abuts against a side of the first limiting slot away from the second limiting slot to restrict the second actuating block from rotating into the second limiting slot; and when the movable limiting block moves to the second position, the second actuating block abuts against a side of the second limiting slot away from the first limiting slot to restrict the first actuating block from rotating into the first limiting slot.

In a preferred embodiment, sides of the first limiting slot and the second limiting slot that are close to each other present a strip-shaped arc transition.

In a preferred embodiment, a torsion spring is disposed at a predetermined position of the fixed bracket, and the torsion spring includes a first elastic arm and a second elastic arm; the movable limiting block is further provided with a reset block, and the first elastic arm and the second elastic arm respectively abut against front and rear sides of the reset block in a moving direction of the movable limiting block, such that the movable limiting block is reset to an initial position after the first actuating block and the second actuating block simultaneously release the restriction on the movable limiting block, where the initial position is located between the first position and the second position.

In a preferred embodiment, the second plug further includes a driving insertion block disposed between the two second rotating blocks; an end of the driving insertion block is hinged to the predetermined position of the fixed bracket through a first hinge shaft, second hinge shafts are disposed on left and right sides of the driving insertion block close to the first hinge shaft, and either of the second hinge shafts is hinged to an end of a first connecting rod; an end of either of the first connecting rods away from the second hinge shaft is hinged to a second connecting rod, and an end of either of the second connecting rods away from the first connecting rod is fixedly connected to an end of the second rotating shaft away from the second contact on the same side, such that when the driving insertion block rotates around the first hinge shaft, the second rotating shaft is driven to rotate accordingly.

In a preferred embodiment, an end of either of the two first connecting rods away from the second hinge shaft is fixedly connected through a connecting block; and when the driving insertion block is retracted to a maximum stroke position, the driving insertion block abuts against a position above the connecting block.

In a preferred embodiment, a limiting block is further disposed at an end of the driving insertion block close to the first hinge shaft; and when the driving insertion block is extended to the maximum stroke, the limiting block abuts against the predetermined position of the fixed bracket.

According to the multifunctional travel plug provided by the present disclosure, the foldable first plug (e.g., a British standard plug) and the second plug (e.g., a European standard plug) are disposed on the same side of the housing, and the two plugs are prevented from being opened simultaneously through an interlocking mechanism, to reduce safety risks during use. Since the two plugs are foldably disposed on the same side of the housing, there is no need to open holes or arrange a push-button structure on another side thereof, such that the plug has a smaller overall thickness and a larger internal space. The plug may be designed to be smaller and thinner, and more aesthetically pleasing with a lower center of gravity, so as to achieve more stable plug-in connection.

BRIEF DESCRIPTION OF THE DRAWINGS

To describe the technical solution in the examples of the present disclosure more clearly, the accompanying drawings required for describing the examples are briefly described below. It should be understood that the following accompanying drawings show merely some examples of the present disclosure, and therefore it should not be construed as a limitation to the scope. Those of ordinary skill in the art can also derive other accompanying drawings from these accompanying drawings without making inventive efforts.

Figure 1:
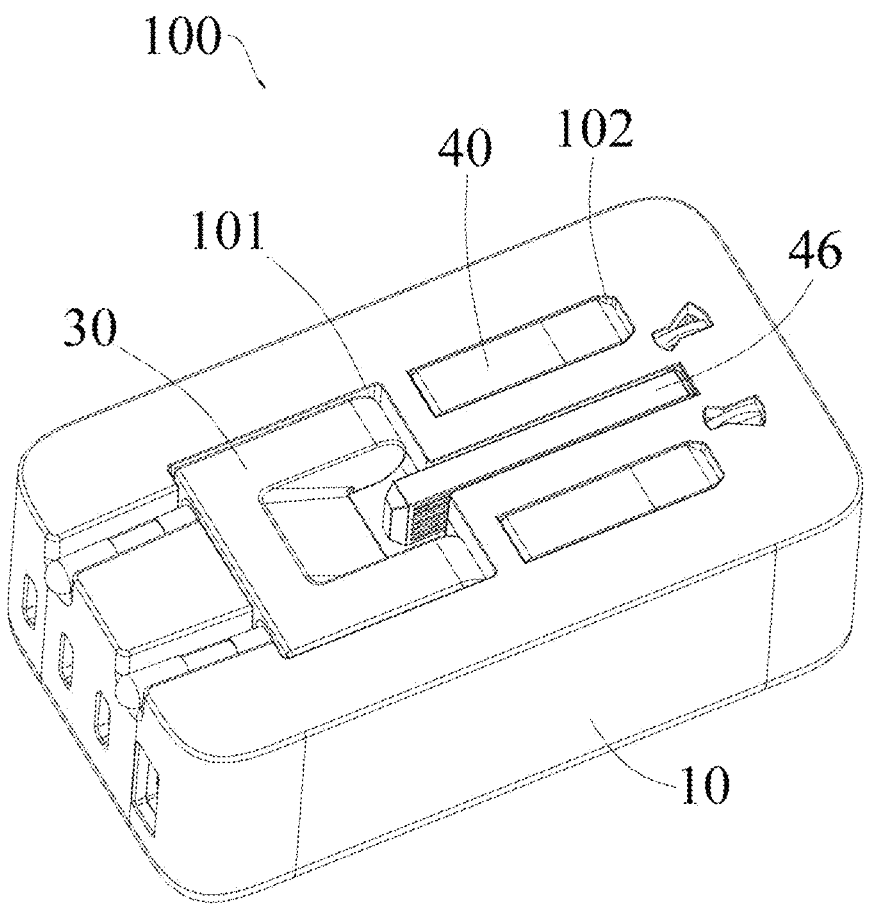
FIG. 1 is a perspective view of a multifunctional travel plug provided by the present disclosure with two plugs in a stored state.

Reference numerals in the figures: 100—multifunctional travel plug; 10—housing; 11—fixed bracket; 12—main board; 13—torsion spring; 131—central ring; 132—first elastic arm; 133—second elastic arm; 101—first accommodating slot; 102—second accommodating slot; 20—conductive sheet; 21—metal sheet body; 22—first conductive elastic piece; 23—second conductive elastic piece; 30—first plug; 31—first rotating block; 32—first rotating shaft; 321—first actuating block; 33—first pin shaft; 34—first contact; 35—first mounting block; 351—first abutment surface; 40—second plug; 41—second rotating block; 42—second rotating shaft; 421—second actuating block; 43—second pin shaft; 44—second contact; 45—second mounting block; 451—second abutment surface; 46—driving insertion block; 461—first hinge shaft; 462—second hinge shaft; 463—limiting block; 47—first connecting rod; 48—second connecting rod; 49—connecting block; 50—movable limiting block; 501—first limiting slot; 502—second limiting slot; and 51—reset block.

DETAILED DESCRIPTIONS OF THE EMBODIMENTS

To make objectives, technical solutions and beneficial technical effects of the present disclosure clearer, the present disclosure will be further described in detail with reference to accompanying drawings and specific embodiments. It should be understood that the specific embodiments described in the present specification are merely illustrative of the present disclosure and are not intended to limit the present disclosure.

It should also be understood that the terms used in the present specification are merely for the purpose of describing specific examples and are not intended to limit the present disclosure. As used in the present specification and the appended claims, the singular terms "a", "an" and "the" are intended to include the plural forms unless clearly indicated otherwise in the context.

It should be further understood that the term "and/or" as used in the present specification and the appended claims refers to and includes any or all possible combinations of one or more of the associated listed items.

In an example of the present disclosure, a multifunctional travel plug 100 is provided and configured to be plugged into a socket to achieve current input from an external power supply, so as to supply power to an electronic device. Plugs of different standards such as American standard, European standard, British standard, Japanese standard, Chinese standard, and Australian standard may be provided simultaneously to enhance the applicability of the present disclosure.

As shown in FIGS. 1-6, the multifunctional travel plug 100 includes: a housing 10, two conductive sheets 20, a first plug 30, a second plug 40, and a movable limiting block 50.

Figure 2:
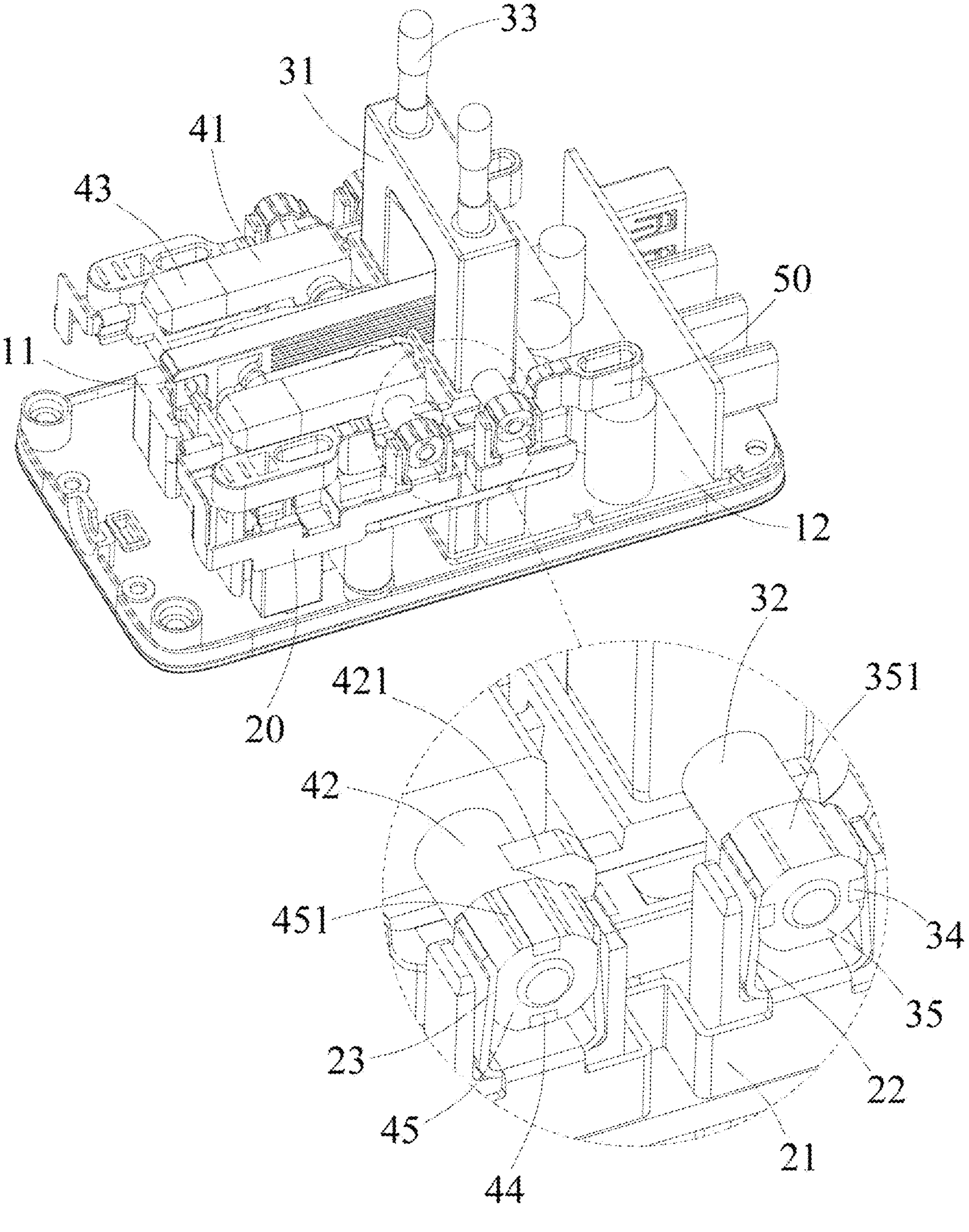
FIG. 2 is a perspective view of the multifunctional travel plug shown in FIG. 1 with a housing hidden and a first plug in an operating state.
Figure 3:
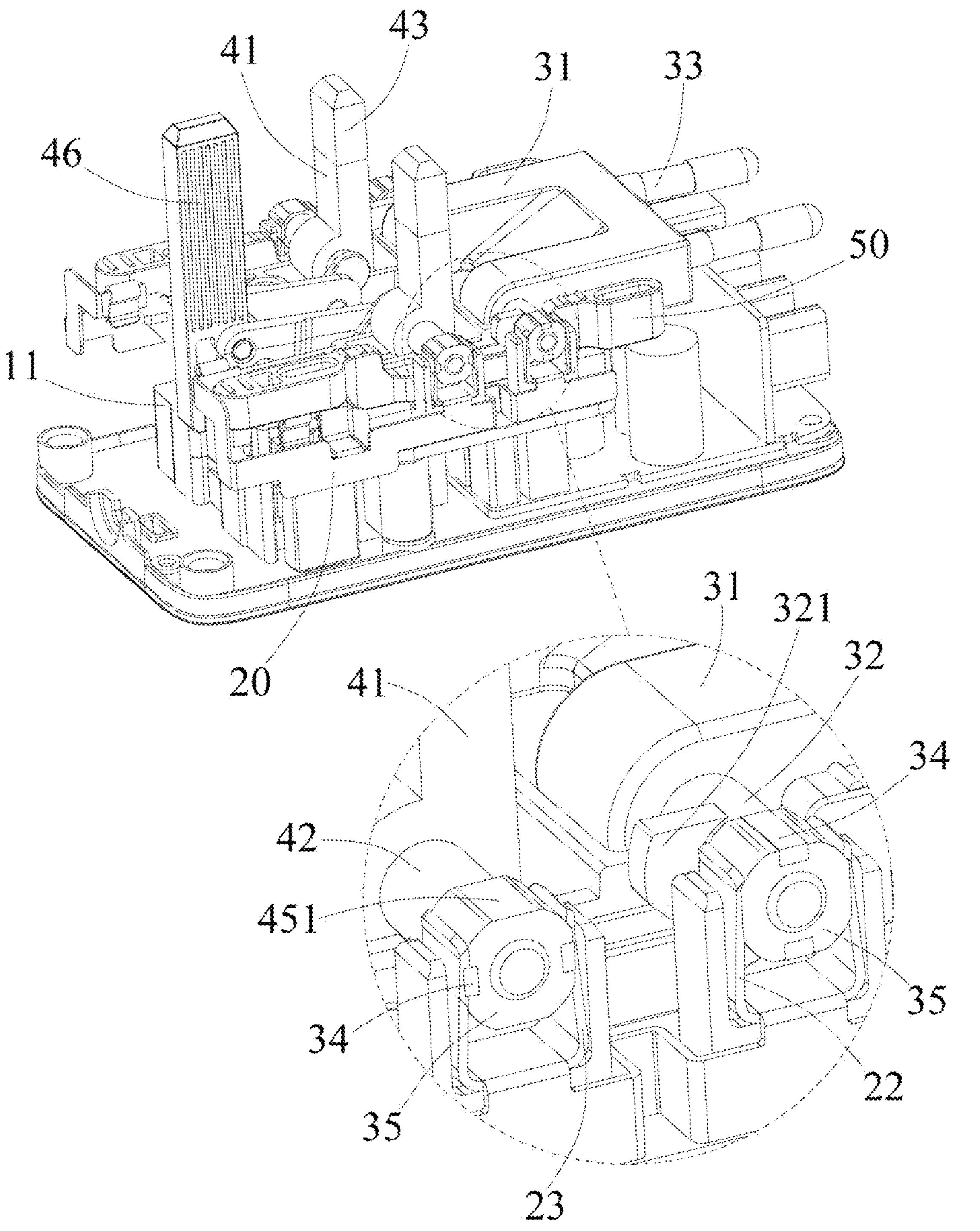
FIG. 3 is a perspective view of the multifunctional travel plug shown in FIG. 1 with a housing hidden and a second plug in an operating state.

As shown in FIGS. 1-3, the housing 10 is roughly cuboid-shaped and internally provided with a fixed bracket 11 and a main board 12. The fixed bracket 11 is configured to fix the two conductive sheets 20 and movably connect the first plug 30, the second plug 40, and the like. The first plug 30 and the second plug 40 are disposed on a same side of the housing 10, and the housing 10 is provided with a first accommodating slot 101 configured to foldably accommodate the first plug 30 and a second accommodating slot 102 configured to foldably accommodate the second plug 40. Therefore, a state where the first plug 30 is rotationally extended from the first accommodating slot 101 to a position perpendicular to a surface of the housing 10 is defined as an operating state of the first plug 30, and a state where the first plug is completely accommodated in the first accommodating slot 101 is defined as a stored state; and the same applies to the second plug 40.

When the first plug 30 is opened, the second plug 40 is restricted from opening from the second accommodating slot 102; and when the second plug 40 is opened, the first plug 30 is restricted from opening from the first accommodating slot 101.

It can be understood that the foldable first plug 30 (e.g., a British standard plug) and the second plug 40 (e.g., a European standard plug) are disposed on the same side of the housing 10, and the two plugs are prevented from being opened simultaneously through an interlocking mechanism, to reduce safety risks during use. Since the two plugs are foldably disposed on the same side of the housing 10, there is no need to open holes or arrange a push-button structure on another side thereof, such that the plug has a smaller overall thickness and a larger internal space. The plug may be designed to be smaller and thinner, and more aesthetically pleasing with a lower center of gravity, so as to achieve more stable plug-in connection.

As shown in FIGS. 2 and 3, the two conductive sheets 20 are respectively fixed to both sides of the fixed bracket 11 and configured to respectively connect positive and negative input interfaces of the main board 12. The main board 12 is configured to rectify and regulate voltage of an external alternating current so as to output an adapted current to an external electronic device. It should be noted that for the implementation principle and specific structure in which the main board 12 converts the external power supply into a power supply adapted to the electronic device, reference to the prior art can be made, which will not be described in detail herein. Either of the conductive sheets 20 includes: a metal sheet body 21, one or two first conductive elastic pieces 22 spaced apart, and one or two second conductive elastic pieces 23 spaced apart that are fixed at predetermined positions of the fixed bracket 11 via a screwed connection, a snap-fitted connection, or the like. The first conductive elastic piece 22 and the second conductive elastic piece 23 are both disposed on the metal sheet body 21, so they may be made of a same material and integrally designed.

In an example of the present disclosure, the first plug 30 includes a first rotating block 31, two first rotating shafts 32 respectively disposed on both sides of the first rotating block 31, and two first pin shafts 33 penetrating the first rotating block 31. The first pin shafts 33 are made of a conductive material, and spacing and shape thereof may be set according to regulations of different countries and regions. The first rotating block 31 is configured to drive the two first pin shafts 33 to switch between the operating state and the stored state and drive the first rotating shaft 32 to rotate around its central axis. A first contact 34 electrically connected to the corresponding first pin shaft 33 is disposed at a predetermined position of either of the first rotating shafts 32. That is, a metal sheet may be embedded in the first rotating shaft 32, one end of the metal sheet is electrically connected to the first pin shaft 33 on a same side, and the other end thereof extends out of the predetermined position of the first rotating shaft 32, thereby forming one or two first contacts 34.

Figure 4:
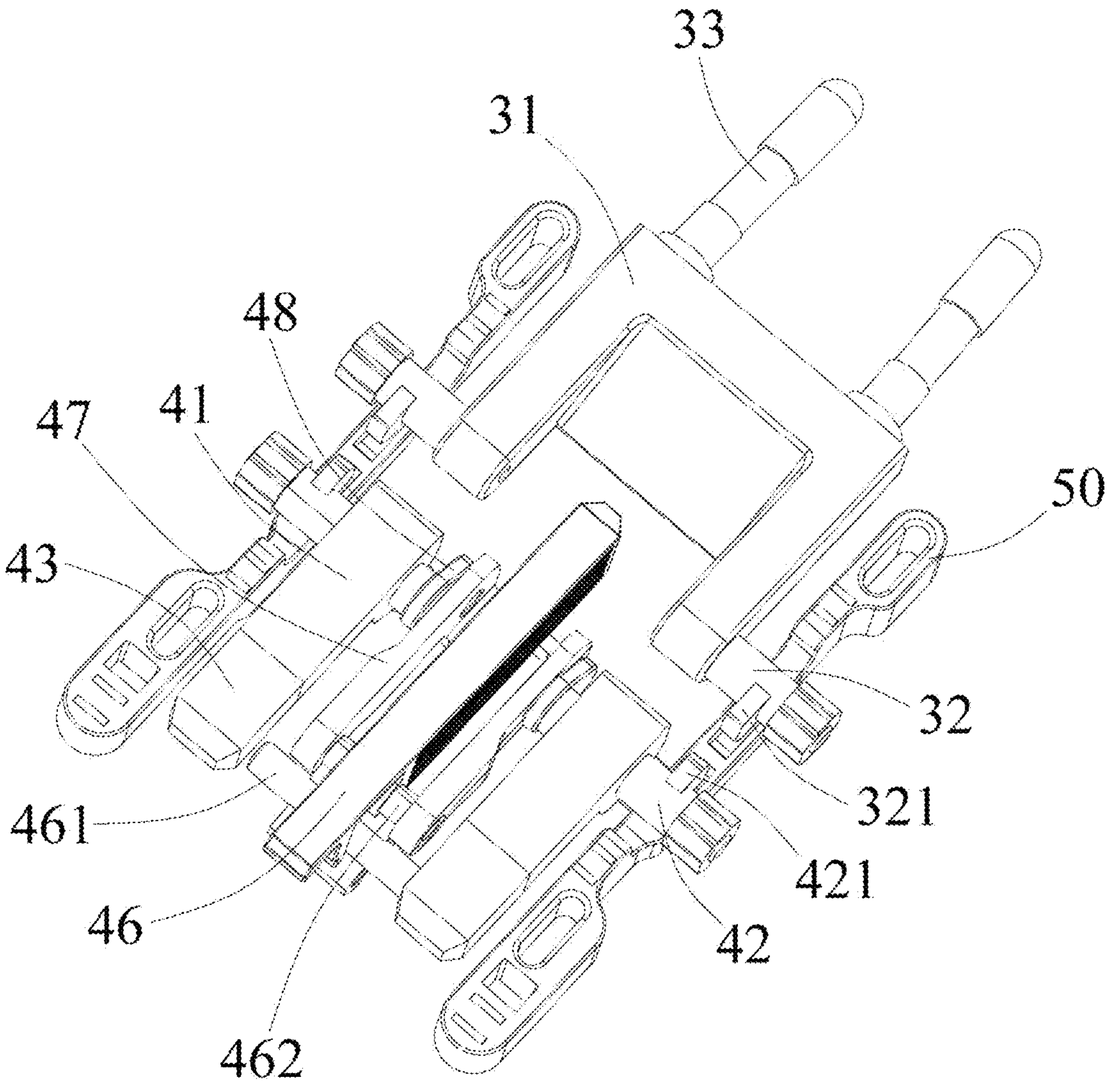
FIG. 4 is a schematic diagram of assembly of two plugs and a movable limiting block in a multifunctional travel plug provided by the present disclosure.
Figure 5:
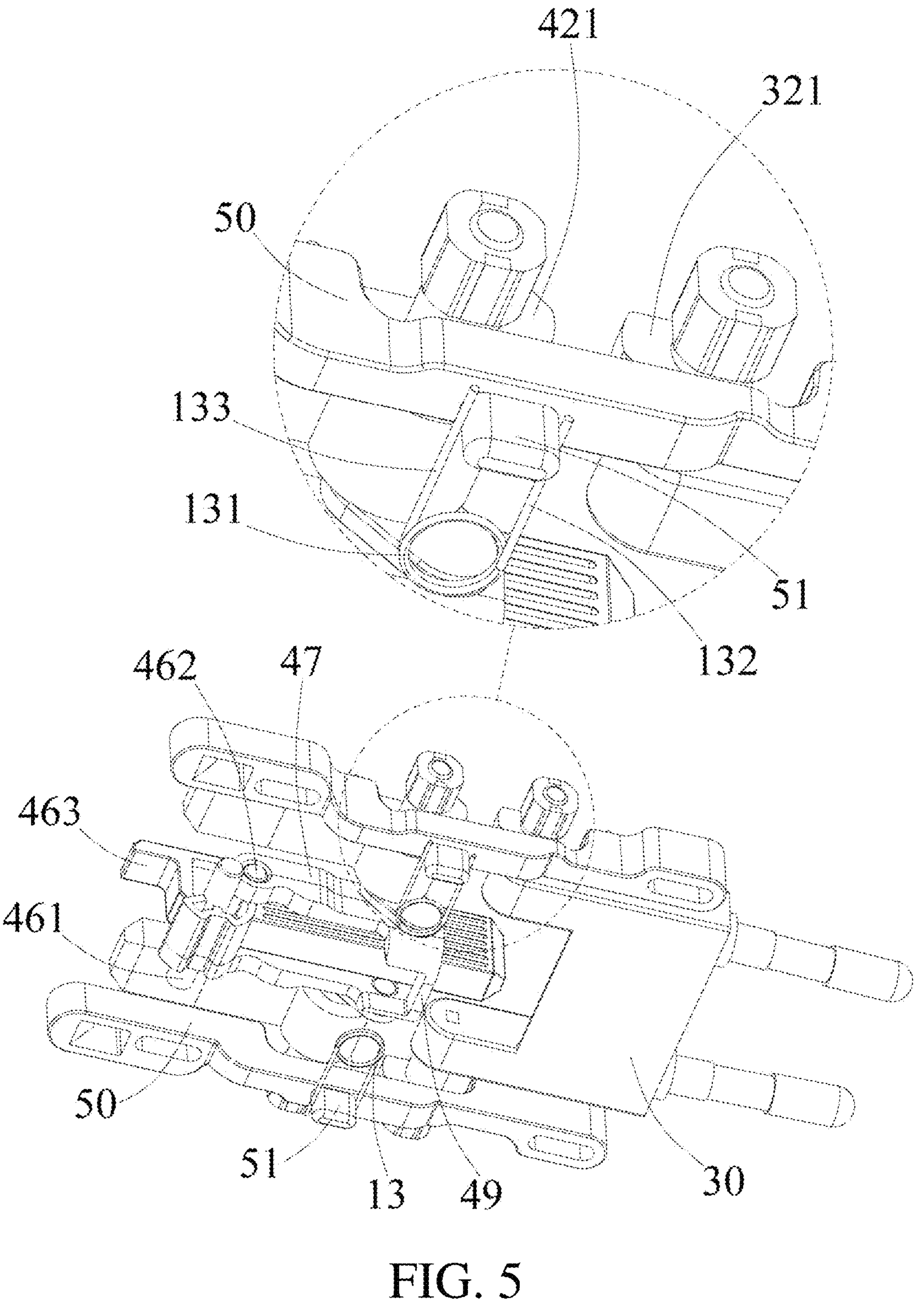
FIG. 5 is a schematic diagram of another view of assembly of two plugs and a movable limiting block in the multifunctional travel plug shown in FIG. 4.

Specifically, a first mounting block 35 is coaxially disposed at an end of the first rotating shaft 32 away from the first rotating block 31. The first mounting block 35 is in cylindrical with a cross-sectional radius larger than a cross-sectional radius of the first rotating shaft 32. As shown in FIGS. 4 and 5, a surface of the first mounting block 35 is cut at a predetermined position, such that four first abutment surfaces 351 enclosing a rectangle are formed. The first contacts 34 are mounted on one of the first abutment surfaces 351 or mounted on two opposite first abutment surfaces 351 to be electrically connected to the first conductive elastic piece 22. When the number of the first contacts 34 is one, the number of the first conductive elastic pieces 22 may also be one; when the number of the first contacts 34 is two, the number of the first conductive elastic pieces 22 is two, and the two first contacts 34 are respectively disposed on the two first abutment surfaces 351 oppositely arranged.

When the first rotating block 31 rotates to the operating state, the first rotating shaft 32 and the first mounting block 35 are driven to rotate, such that the first contacts 34 are driven to rotate, and the first contacts 34 corresponding to the first rotating shafts 32 on both sides are respectively electrically connected to the two conductive sheets 20. In this case, the first abutment surface 351 provided with the first contact 34 abuts against the first conductive elastic piece 22, such that the first contact 34 tightly abuts against the first conductive elastic piece 22 to form an electrical connection.

In this example, the second plug 40 includes two second rotating blocks 41, two second rotating shafts 42 respectively disposed on a side on which the two second rotating blocks 41 are mutually away from each other, and two second pin shafts 43 respectively penetrating the two second rotating blocks 41. It should be noted that for the implementation principles of related structures of the second rotating shaft 42, the second pin shaft 43, and a second mounting block 45, reference to the above first rotating shaft 32, the first pin shaft 33, and the first mounting block 35 can be made, which will not be described in detail herein. The number of the second rotating blocks 41 is two. Alternatively, in some examples, the two second rotating blocks 41 may be designed integrally to form a structure similar to the first rotating block 31.

Specifically, a second contact 44 electrically connected to the corresponding second pin shaft 43 is disposed at a predetermined position of either of the second rotating shafts 42. The second mounting block 45 is coaxially disposed at an end of the second rotating shaft 42 away from the second rotating block 41, the second mounting block 45 includes four second abutment surfaces 451 enclosing a rectangle, and the second contacts 44 are mounted on one of the second abutment surfaces 451 or mounted on two opposite second abutment surfaces 451 to be electrically connected to the second conductive elastic piece 23. When the two second rotating blocks 41 rotate to the operating state, the two second contacts 44 are respectively electrically connected to the two conductive sheets 20. The second rotating shaft 42 is configured to drive the second contact 44 to rotate to abut against or be away from the second conductive elastic piece 23.

Further, a free end of the first conductive elastic piece 22 is inclined in a direction away from the first mounting block 35, and a free end of the second conductive elastic piece 23 is inclined in a direction away from the second mounting block 45, such that an outwardly flared trumpet-shaped structure is formed in both cases, which facilitates assembly and positioning. The adjacent first abutment surfaces 351 may be chamfered or arc-transitioned, and the adjacent second abutment surfaces 451 may be chamfered or arc-transitioned to enhance tactile feedback during rotation and reduce the difficulty of rotation.

In this example, the second plug 40 further includes a driving insertion block 46 disposed between the two second rotating blocks 41. The driving insertion block 46 and the two second rotating blocks 41 together enclose an isosceles triangle to obtain a predetermined triangular plug. The driving insertion block 46 mentioned herein may either be part of a conductive structure of the triangular plug or be a simple driving structure configured to drive the two second rotating blocks 41 to rotate.

Specifically, as shown in FIG. 4, an end of the driving insertion block 46 is hinged to the predetermined position of the fixed bracket 11 through a first hinge shaft 461, such that the driving insertion block 46 may rotate by at least 90° relative to the fixed bracket 11. Second hinge shafts 462 are disposed on left and right sides of the driving insertion block 46 close to the first hinge shaft 461, and either of the second hinge shafts 462 is hinged to an end of a first connecting rod 47. An end of either of the first connecting rods 47 away from the second hinge shaft 462 is hinged to a second connecting rod 48. An end of either of the second connecting rods 48 away from the first connecting rod 47 is fixedly connected to an end of the second rotating shaft 42 away from the second contact 44 on the same side, such that when the driving insertion block 46 rotates around the first hinge shaft 461, the first connecting rod 47 drives the second connecting rod 48 to move adaptively, which drives the second rotating shaft 42 to rotate accordingly, and finally drives the rotation of the second rotating block 41.

Further, an end of either of the two first connecting rods 47 away from the second hinge shaft 462 is fixedly connected through a connecting block 49, such that the two first connecting rods 47 form an integral structure and rotate synchronously, thereby achieving synchronous rotation of the two second rotating shafts 42. When the driving insertion block 46 is retracted to a maximum stroke position, the driving insertion block 46 abuts against a position above the connecting block 49, and in this case, the two first connecting rods 47 are respectively located on the left and right sides of the driving insertion block 46.

Further, a limiting block 463 is further disposed at an end of the driving insertion block 46 close to the first hinge shaft 461. The limiting block 463 is located at a top of the driving insertion block 46. When the driving insertion block 46 is extended to the maximum stroke, the limiting block 463 rotates accordingly and abuts against the predetermined position of the fixed bracket 11 to prevent the driving insertion block 46 from continuing to rotate, thereby achieving limiting of the driving insertion block 46.

In an example of the present disclosure, the movable limiting block 50 is disposed in the housing 10. The movable limiting block 50 is elongated, and the number of the movable limiting blocks may be one or two. When the number of the movable limiting blocks is two, the two conductive sheets 20 are correspondingly arranged to improve the stability of limiting.

Figure 6:
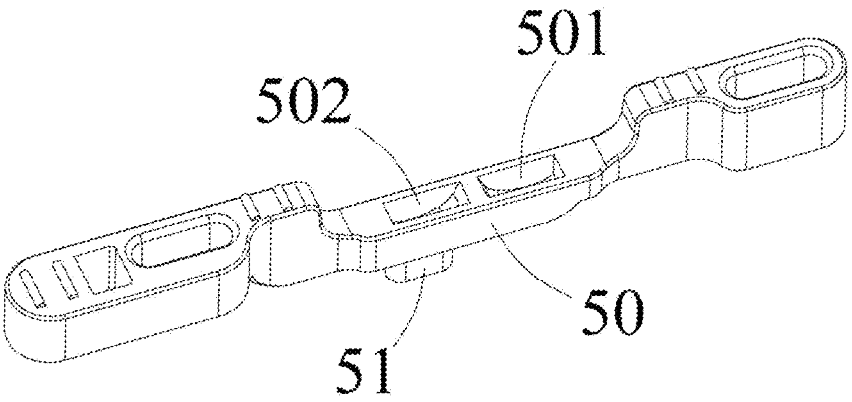
FIG. 6 is a perspective view of a movable limiting block in the multifunctional travel plug shown in FIG. 1.

Specifically, as shown in FIG. 6, a first limiting slot 501 and a second limiting slot 502 spaced apart from each other are disposed at a top of the movable limiting block 50, side walls of the first limiting slot 501 and the second limiting slot 502 that are away from each other are perpendicular to a moving direction of the movable limiting block 50, that is, a vertical surface perpendicular to a top surface of the movable limiting block 50 is formed. Correspondingly, the first rotating shaft 32 is further provided with a first actuating block 321, and the second rotating shaft 42 is further provided with a second actuating block 421. When the first plug 30 rotates to the operating state, the first actuating block 321 pushes the movable limiting block 50 to a first position, such that the movable limiting block 50 restricts the rotation of the second actuating block 421, and in this case, the second plug 40 is restricted from rotating and cannot be extended to the operating state. That is, the first actuating block 321 abuts against a side of the first limiting slot 501 away from the second limiting slot 502 to restrict the second actuating block 421 from rotating into the second limiting slot 502 so as to drive the movable limiting block 50 to move. When the first plug 30 is in the stored state, the first actuating block 321 rotates to a position above the first limiting slot 501, thereby releasing the restriction on the movable limiting block 50.

Similarly, when the second plug 40 rotates to the operating state, the second actuating block 421 pushes the movable limiting block 50 to a second position, such that the movable limiting block 50 restricts the rotation of the first actuating block 321, and in this case, the first plug 30 is restricted from rotating and cannot be extended to the operating state. That is, the second actuating block 421 abuts against a side of the second limiting slot 502 away from the first limiting slot 501 to restrict the first actuating block 321 from rotating into the first limiting slot 501 so as to drive the movable limiting block 50 to move. When the second plug 40 is in the stored state, the second actuating block 421 rotates to a position above the second limiting slot 502, thereby releasing the restriction on the movable limiting block 50.

Sides of the first limiting slot 501 and the second limiting slot 502 that are close to each other present a strip-shaped arc transition, which facilitates smooth rotation of the first actuating block 321 or the second actuating block 421 into the corresponding limiting slot when rotation is not restricted.

Further, as shown in FIG. 5, a torsion spring 13 is disposed at a predetermined position of the fixed bracket 11. The torsion spring 13 includes a central ring 131, and a first elastic arm 132 and a second elastic arm 133 extending outward from the central ring 131, where the two elastic arms are in a retracted state when idle, such that a retracting elastic force is generated when stretched by an external force. The central ring 131 of the torsion spring 13 is sleeved on a rod structure of the fixed bracket 11. Correspondingly, a reset block 51 is further disposed at a bottom of the movable limiting block 50. The first elastic arm 132 and the second elastic arm 133 respectively abut against front and rear sides of the reset block 51 in a moving direction of the movable limiting block 50, such that the movable limiting block 50 is reset to an initial position after the first actuating block 321 and the second actuating block 421 simultaneously release the restriction on the movable limiting block 50 (i.e., both the first plug 30 and the second plug 40 are in the stored state), where the initial position is located between the first position and the second position. In this case, rotation of the first actuating block 321 may drive the movable limiting block 50 from the initial position to the first position, or rotation of the second actuating block 421 may drive the movable limiting block 50 from the initial position to the second position.

In summary, the multifunctional travel plug 100 provided by the present disclosure achieves a simple and efficient mechanical interlocking trigger mechanism by introducing the movable limiting block 50 and combining the first actuating block 321 on the first rotating shaft 32 and the second actuating block 421 on the second rotating shaft 42. When the user rotates the first plug 30 to the operating state, the first rotating shaft 32 rotates accordingly, which drives the first actuating block 321 thereon to move; and during rotation, the first actuating block 321 pushes the movable limiting block 50 to move to the first position. In terms of a physical position, the movable limiting block 50 at the first position just blocks or clamps the second actuating block 421 on the second rotating shaft 42 of the second plug 40, which completely restricts a rotation space of the second actuating block 421 (further restricts the second rotating shaft 42 and the second rotating block 41), such that the second plug 40 cannot be rotated and extended to the operating state. Similarly, the second actuating block 421, during rotation, pushes the movable limiting block 50 to move to the second position, such that the first plug 30 cannot be rotated and extended to the operating state. The resulting beneficial effects include:

(1) Absolute prevention of simultaneous operation: The physical mutual exclusion in the operating state switching of the first plug 30 and the second plug 40 is achieved through a purely mechanical structure. Under any operational conditions, only one plug may be successfully extended and connected to a power supply, thereby fundamentally eliminating the serious safety risks such as a short-circuit fault, arcing, and fire caused by the user's misoperations including connection of two plugs to the power supply simultaneously.

(2) Simple and reliable structure: The symmetric interlocking mechanism cleverly utilizes the actuating block on the rotating shaft as a driving source when the plug is rotated to drive a single movable limiting block 50 to achieve position switching, which further locks the actuating block of another plug. The structure features few components, clear operational principles, high reliability, and low likelihood of failure.

(3) Intuitive operation without additional steps: An interlocking action naturally occurs during rotation of the plug, and the user only needs to rotate the required plug like operating an ordinary rotatable plug to automatically activate the interlocking function, without the need to perform additional locking or unlocking operations, thereby enhancing user experience.

The present disclosure is not limited merely to what is described in the specification and the embodiments, such that additional advantages and modifications can be readily achieved by those skilled in the art. Without departing from the spirit and scope of the general concept as defined by the claims and the equivalents, the present disclosure is not limited to the specific details, representative apparatus, and illustrative examples as shown and described herein.

What is claimed is:

1. A multifunctional travel plug, comprising a housing, a first plug, and a second plug;

the first plug and the second plug are disposed on a same side of the housing, and the housing is provided with a first accommodating slot configured to accommodate the first plug and a second accommodating slot configured to accommodate the second plug; and when the first plug is opened, the second plug is restricted from opening from the second accommodating slot; and when the second plug is opened, the first plug is restricted from opening from the first accommodating slot;

two conductive sheets and a movable limiting block; the housing is internally provided with a fixed bracket and a main board; the movable limiting block is disposed in the housing; the two conductive sheets are fixed to both sides of the fixed bracket and configured to connect positive and negative input interfaces of the main board;

the first plug comprises a first rotating block, two first rotating shafts disposed on both sides of the first rotating block, and two first pin shafts penetrating the first rotating block, a first contact electrically connected to the corresponding first pin shaft is disposed at a predetermined position of either of the first rotating shafts, and when the first rotating block rotates to an operating state, the first contacts on both sides are electrically connected to the two conductive sheets; and the second plug comprises two second rotating blocks, two second rotating shafts disposed on a side on which the two second rotating blocks are away from each other, and two second pin shafts penetrating the two second rotating blocks, wherein a second contact electrically connected to the corresponding second pin shaft is disposed at a predetermined position of either of the second rotating shafts, and when the two second rotating blocks rotate to the operating state, the two second contacts are electrically connected to the two conductive sheets; the first rotating shaft is further provided with a first actuating block, and the second rotating shaft is further provided with a second actuating block; when the first plug rotates to the operating state, the first actuating block pushes the movable limiting block to a first position, such that the movable limiting block restricts the rotation of the second actuating block; and when the second plug rotates to the operating state, the second actuating block pushes the movable limiting block to a second position, such that the movable limiting block restricts the rotation of the first actuating block.

2. The multifunctional travel plug according to claim 1, wherein the second plug further comprises a driving insertion block disposed between the two second rotating blocks; an end of the driving insertion block is hinged to the predetermined position of the fixed bracket through a first hinge shaft, second hinge shafts are disposed on left and right sides of the driving insertion block close to the first hinge shaft, and either of the second hinge shafts is hinged to an end of a first connecting rod; an end of either of the first connecting rods away from the second hinge shaft is hinged to a second connecting rod, and an end of either of the second connecting rods away from the first connecting rod is fixedly connected to an end of the second rotating shaft away from the second contact on the same side, such that when the driving insertion block rotates around the first hinge shaft, the second rotating shaft is driven to rotate.

3. The multifunctional travel plug according to claim 2, wherein an end of either of the two first connecting rods away from the second hinge shaft is fixedly connected through a connecting block; and when the driving insertion block is retracted to a maximum stroke position, the driving insertion block abuts against a position above the connecting block.

4. The multifunctional travel plug according to claim 1, wherein either of the conductive sheets comprises: a metal sheet body, one or two first conductive elastic pieces spaced apart, and one or two second conductive elastic pieces spaced apart; the first conductive elastic piece and the second conductive elastic piece are both disposed on the metal sheet body; the first rotating shaft is configured to drive the first contact to rotate to abut against or be away from the first conductive elastic piece; and the second rotating shaft is configured to drive the second contact to rotate to abut against or be away from the second conductive elastic piece.

5. The multifunctional travel plug according to claim 4, wherein a first mounting block is disposed at an end of the first rotating shaft away from the first rotating block, the first mounting block comprises four first abutment surfaces enclosing a rectangle, and the first contacts are mounted on one of the first abutment surfaces or mounted on two opposite first abutment surfaces to be electrically connected to the first conductive elastic piece; and a second mounting block is disposed at an end of the second rotating shaft away from the second rotating block, the second mounting block comprises four second abutment surfaces enclosing a rectangle, and the second contacts are mounted on one of the second abutment surfaces or mounted on two opposite second abutment surfaces to be electrically connected to the second conductive elastic piece.

6. The multifunctional travel plug according to claim 5, wherein a free end of the first conductive elastic piece is inclined in a direction away from the first mounting block, and a free end of the second conductive elastic piece is inclined in a direction away from the second mounting block.

7. The multifunctional travel plug according to claim 1, wherein a first limiting slot and a second limiting slot spaced apart from each other are disposed at the movable limiting block, and sides of the first limiting slot and the second limiting slot that are away from each other are perpendicular to a moving direction of the movable limiting block; when the movable limiting block moves to the first position, the first actuating block abuts against a side of the first limiting slot away from the second limiting slot to restrict the second actuating block from rotating into the second limiting slot; and when the movable limiting block moves to the second position, the second actuating block abuts against a side of the second limiting slot away from the first miting slot to restrict the first actuating block from rotating into the first limiting slot.

8. The multifunctional travel plug according to claim 7, wherein sides of the first limiting slot and the second limiting slot that are close to each other present a strip-shaped arc transition.

9. The multifunctional travel plug according to claim 7, wherein a torsion spring is disposed at a predetermined position of the fixed bracket, and the torsion spring comprises a first elastic arm and a second elastic arm; the movable limiting block is further provided with a reset block, and the first elastic arm and the second elastic arm respectively abut against front and rear sides of the reset block in a moving direction of the movable limiting block, such that the movable limiting block is reset to an initial position after the first actuating block and the second actuating block release the restriction on the movable limiting block, wherein the initial position is located between the first position and the second position.

* * * * *